United States Patent
Kim et al.

(10) Patent No.: US 11,025,319 B2
(45) Date of Patent: Jun. 1, 2021

(54) METHOD FOR TRANSMITTING/RECEIVING DATA SIGNAL BETWEEN BASE STATION AND TERMINAL IN WIRELESS COMMUNICATION SYSTEM AND APPARATUS SUPPORTING SAME

(71) Applicant: LG ELECTRONICS INC., Seoul (KR)

(72) Inventors: Kijun Kim, Seoul (KR); Byounghoon Kim, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/065,110

(22) PCT Filed: May 2, 2017

(86) PCT No.: PCT/KR2017/004642
§ 371 (c)(1),
(2) Date: Jun. 21, 2018

(87) PCT Pub. No.: WO2017/196019
PCT Pub. Date: Nov. 16, 2017

(65) Prior Publication Data
US 2019/0007117 A1   Jan. 3, 2019

Related U.S. Application Data

(60) Provisional application No. 62/334,414, filed on May 10, 2016.

(51) Int. Cl.
*H04B 7/06* (2006.01)
*H04W 72/04* (2009.01)
(Continued)

(52) U.S. Cl.
CPC .......... *H04B 7/0617* (2013.01); *H04B 7/024* (2013.01); *H04B 7/0695* (2013.01); *H04B 7/088* (2013.01);
(Continued)

(58) Field of Classification Search
CPC .... H04B 7/0617; H04B 17/318; H04B 7/024; H04B 7/0695; H04B 7/088; H04B 7/086;
(Continued)

(56) References Cited

U.S. PATENT DOCUMENTS

| 9,935,807 B2* | 4/2018 | Koorapaty | ............ H04L 27/262 |
| 2005/0181831 A1* | 8/2005 | Doi | ........................ H01Q 1/246 455/562.1 |

(Continued)

FOREIGN PATENT DOCUMENTS

| KR | 1020090021293 | 3/2009 |
| KR | 1020110139726 | 12/2011 |

(Continued)

OTHER PUBLICATIONS

Of R1-162145 ( "Overview of Radio Access Mechanism for 5G", Huawei 3GPP TS Rang WGI Meeting #84bis, Bushan, Korea, Apr. 11-15, 2016) (Year: 2016).*

(Continued)

*Primary Examiner* — Jaison Joseph
(74) *Attorney, Agent, or Firm* — Lee Hong Degerman Kang & Waimey

(57) ABSTRACT

Disclosed are a method for transmitting/receiving a data signal between a base station and a terminal, and an apparatus supporting the same. More particularly, the present invention provides a method for reliably transmitting/receiving a data signal between a terminal and a base station when the data signal transmission/reception between the terminal (Continued)

and the base station is performed according to an analog beamforming method, and apparatuses supporting the same.

15 Claims, 11 Drawing Sheets

(51) Int. Cl.
  *H04B 7/024* (2017.01)
  *H04B 7/08* (2006.01)
  *H04L 5/00* (2006.01)
  *H04B 17/318* (2015.01)

(52) U.S. Cl.
  CPC ............. *H04L 5/00* (2013.01); *H04W 72/046* (2013.01); *H04W 72/0446* (2013.01); *H04B 7/0626* (2013.01); *H04B 7/086* (2013.01); *H04B 17/318* (2015.01)

(58) Field of Classification Search
  CPC .... H04B 7/0626; H04L 5/00; H04W 72/0446; H04W 72/06
  See application file for complete search history.

(56) References Cited

U.S. PATENT DOCUMENTS

| | | | | |
|---|---|---|---|---|
| 2005/0239507 A1* | 10/2005 | Doi | ...................... | H04B 7/0615 455/562.1 |
| 2009/0196203 A1 | 8/2009 | Taira et al. | | |
| 2012/0063386 A1* | 3/2012 | Park | ...................... | H04B 7/155 370/315 |
| 2013/0072243 A1* | 3/2013 | Yu | ...................... | H04B 7/0695 455/509 |
| 2013/0250882 A1* | 9/2013 | Dinan | ................... | H04L 5/0032 370/329 |
| 2013/0315195 A1* | 11/2013 | Ko | ...................... | H04W 72/082 370/329 |
| 2014/0044061 A1* | 2/2014 | Yue | .................... | H04W 72/042 370/329 |
| 2014/0098761 A1* | 4/2014 | Lee | ..................... | H04W 74/006 370/329 |
| 2014/0105110 A1* | 4/2014 | Hoshino | ............... | H04W 52/18 370/328 |
| 2014/0286291 A1 | 9/2014 | Einhaus et al. | | |
| 2015/0029966 A1* | 1/2015 | Park | ...................... | H04L 5/0014 370/329 |
| 2015/0296533 A1* | 10/2015 | Park | ...................... | H04B 7/208 370/329 |
| 2016/0174247 A1* | 6/2016 | Ruiz Delgado | ....... | H04W 48/16 370/329 |
| 2016/0242203 A1* | 8/2016 | You | ...................... | H04L 5/0053 |
| 2016/0278054 A1* | 9/2016 | You | ...................... | H04L 5/0053 |
| 2017/0041932 A1* | 2/2017 | Chae | ..................... | H04W 72/04 |
| 2017/0093538 A1* | 3/2017 | Yoon | ..................... | H04B 7/024 |
| 2017/0230985 A1* | 8/2017 | Yamada | ............... | H04B 1/7103 |
| 2017/0302341 A1* | 10/2017 | Yu | ....................... | H04W 72/046 |
| 2017/0311290 A1* | 10/2017 | Adjakple | ............. | H04W 76/18 |
| 2017/0332371 A1* | 11/2017 | Kubota | ................ | H04B 7/0621 |
| 2018/0007682 A1* | 1/2018 | Takeda | .................. | H04W 24/10 |
| 2018/0212736 A1* | 7/2018 | Chatterjee | ............. | H04L 5/0048 |
| 2019/0045541 A1* | 2/2019 | Niu | ....................... | H04W 76/27 |

FOREIGN PATENT DOCUMENTS

| | | |
|---|---|---|
| KR | 1020130030225 | 3/2013 |
| KR | 1020150006381 | 1/2015 |
| KR | 1020150018792 | 2/2015 |
| KR | 1020150046530 | 4/2015 |

OTHER PUBLICATIONS

PCT International Application No. PCT/KR2017/004642, Written Opinion of the International Searching Authority dated Aug. 10, 2017, 12 pages.

Huawei, et al., "Overview of Radio Access Mechanism for 5G", 3GPP TSG RAN WG1 Meeting #84bis, R1-162145, Apr. 2016, 4 pages.

* cited by examiner

FIG. 11

| A | B | C |
|---|---|---|
| D | | E |

METHOD FOR TRANSMITTING/RECEIVING DATA SIGNAL BETWEEN BASE STATION AND TERMINAL IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2017/004642, filed on May 2, 2017, which claims the benefit of U.S. Provisional Application No. 62/334,414, filed on May 10, 2016, the contents of which are all hereby incorporated by reference herein in their entirety.

TECHNICAL FIELD

The following description relates to a wireless communication system, and more particularly, to a method for transmitting/receiving data signals between a terminal (or user equipment) and a base station in a wireless communication system and apparatuses supporting the same.

More specifically, the following description relates to a method for receiving, by a user equipment, a data signal using an optimum reception beam according to a transmission beam through which a base station transmits the data signal in the case where the data signal is transmitted and received between the user equipment and the base station using analog beamforming, and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies in a method for a base station and a user equipment to efficiently transmit and receive data signals.

In particular, it is an object of the present invention to provide a method for transmitting and receiving data signals between a user equipment and a base station with high reliability when the data signals are transmitted and received between the base station and the user equipment using analog beamforming.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method and apparatuses for transmitting and receiving data signals between a base station and a user equipment in a wireless communication system.

In one aspect of the present invention, provided herein is a method for receiving, by a user equipment (or terminal) including a plurality of antenna elements, a data signal from a base station including one more transmission reception points (TRPs) in a wireless communication system, the method including receiving, from the base station, information about a transmission beam for transmitting the data signal, and receiving the data signal from the base station using a reception beam corresponding to the transmission beam.

In another aspect of the present invention, provided herein is a user equipment including a plurality of antenna elements for receiving a data signal from a base station including one or more transmission reception points (TRPs) in a wireless communication system, the user equipment including a transmitter, a receiver, and a processor configured to operate in connection with the transmitter and the receiver, wherein the processor is configured to receive, from the base station, information about a transmission beam for transmitting the data signal and receive the data signal from the base station using a reception beam corresponding to the transmission beam.

For example, the data signal may be transmitted through a physical downlink shared channel (PDSCH), wherein the information about the transmission beam for transmitting the data signal may be transmitted through a physical downlink control channel (PDCCH) corresponding to the PDSCH.

In this case, the information about the transmission beam for transmitting the data signal is transmitted may include at least one of a beam index for the transmission beam and a reference signal index corresponding to the transmission beam.

In addition, a gap of a predetermined length of time may be included between a transmission end point of the PDCCH and a transmission start point of the PDSCH.

Here, the user equipment may receive the PDSCH using various reception beams to receive the PDCCH. For example, the user equipment may receive the PDCCH using a reception beam corresponding to a preconfigured transmission beam.

As another example, the information about the transmission beam for transmitting the data signal may include information indicating a transmission beam for each subframe set. In this case, the user equipment may receive the data signal using a reception beam corresponding to a transmission beam corresponding to a subframe set including a subframe in which the data signal is transmitted.

In addition, the user equipment may receive a reference signal for each of a plurality of transmission beams from the base station, and report, to the base station, information about one or more reference signals satisfying a predetermined condition among the received reference signals. At this time, the predetermined condition may be whether RSRP is greater than or equal to a certain RSRP. Thus, the transmission beam for transmitting the data signal may correspond to one of the one or more reference signals reported by the user equipment to the base station.

Herein, the information reported by the user equipment to the base station may be RSRP for each reference signal or include RSRP for each reference signal or information about a reception beam of the user equipment used to receive each reference signal.

In addition, for a pairing operation between the transmission beam of the base station and the reception beam of the user equipment, the user equipment may receive information about a transmission beam set for transmission of the data signal among transmission beams corresponding to the one or more reference signals from the base station, and determine an optimum reception beam for each of transmission beams included in the transmission beam set for transmission of the data signal. In other words, the base station may provide the user equipment with information about the transmission beam set to be used for transmission of the data signal to the user equipment in advance. Thereafter, the data signal may be transmitted through one of the transmission beams included in the transmission beam set for transmission of the data signal.

Herein, the information about the transmission beam set for transmission of the data signal may include one or more of one or more transmission beam indexes for transmission of the data signal and a channel state information reference signal (CSI-RS) corresponding to one or more transmission beams for transmission of the data signal.

In addition, the user equipment may transmit acknowledgment information about the data signal received from the base station to the base station. In this operation, similarly to the method for receiving the data signal disclosed above, the user equipment may transmit the acknowledgment information in a specific beam direction.

More specifically, the user equipment may transmit the acknowledgment information to the base station using a transmission beam of the user equipment corresponding to one of a reception beam of the user equipment corresponding to a transmission beam of the base station configured through remote radio control (RRC) signaling, a reception beam of the user equipment corresponding to a transmission beam of the base station indicated by scheduling information about the data signal, a reception beam used to receive the scheduling information about the data signal, or a reception beam used to receive the data signal.

In another aspect of the present invention, provided herein is a method for transmitting, by a base station including one or more transmission reception points (TRPs), a data signal to a user equipment including a plurality of antenna elements in a wireless communication system, the method including transmitting, to the user equipment, information about a transmission beam for transmitting the data signal, and transmitting the data signal to the user equipment using the transmission beam.

In another aspect of the present invention, provided herein is a base station including one more transmission reception points (TRPs) for transmitting a data signal to a user equipment including a plurality of antenna elements in a wireless communication system, the base station including a transmitter, a receiver, and a processor configured to operate in connection with the transmitter and the receiver, wherein the processor is configured to transmit, to the user equipment, information about a transmission beam for transmitting the data signal and transmit the data signal to the user equipment using the transmission beam.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, a base station and a user equipment may determine optimum transmission beam/reception beams that enable highly reliable data transmission/reception therebetween, using analog beamforming.

In addition, according to the present invention, a user equipment may efficiently acquire information about a transmission beam through which a data signal is transmitted from a base station, and receive the data signal using an optimum reception beam determined based thereon.

Additionally, according to the present invention, the user equipment may transmit acknowledgment information about the data signal to the base station with high reliability.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 11 is a diagram illustrating an example of the parity check matrix applicable to the LDPC code.

BEST MODE

Figure 1:
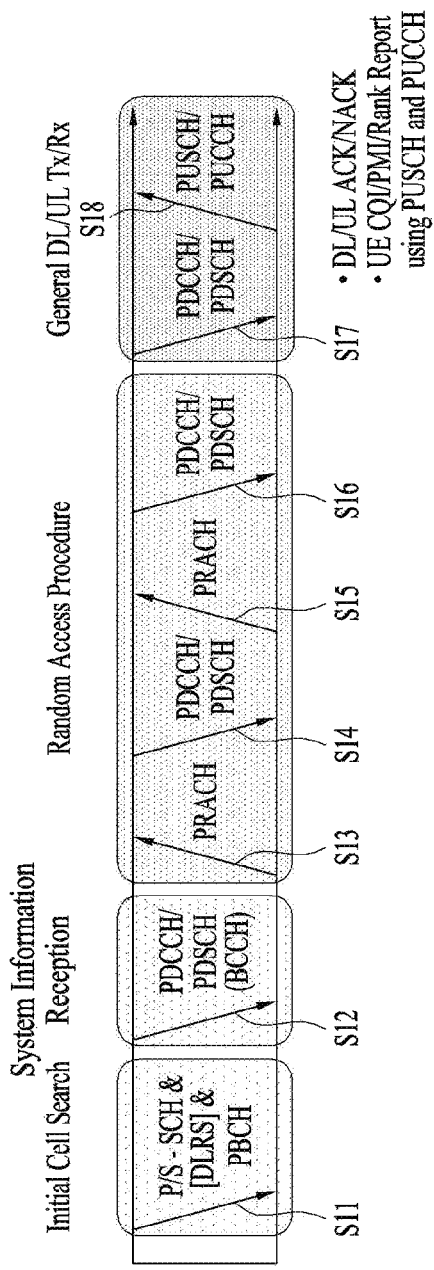
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (FDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. FDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
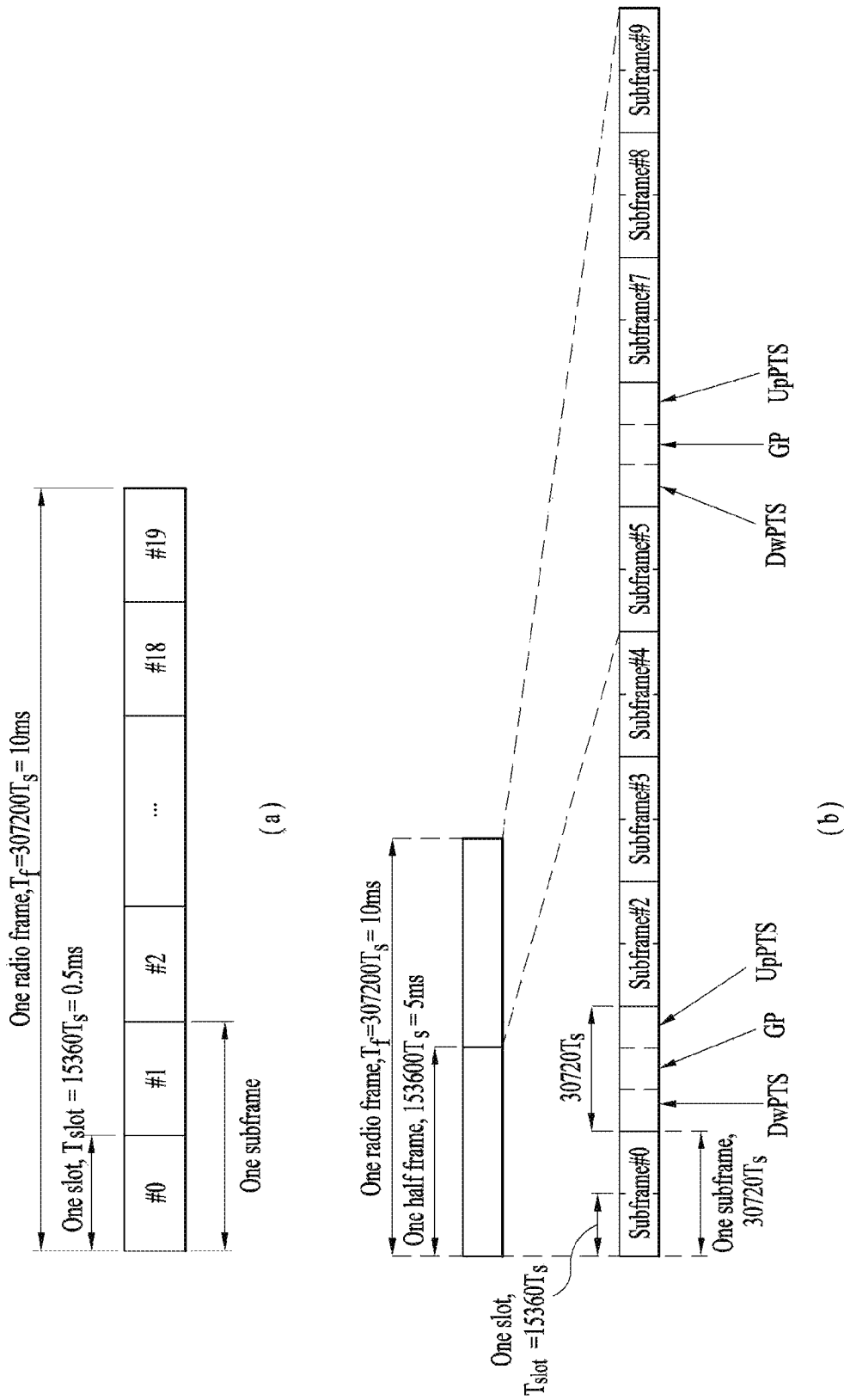
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
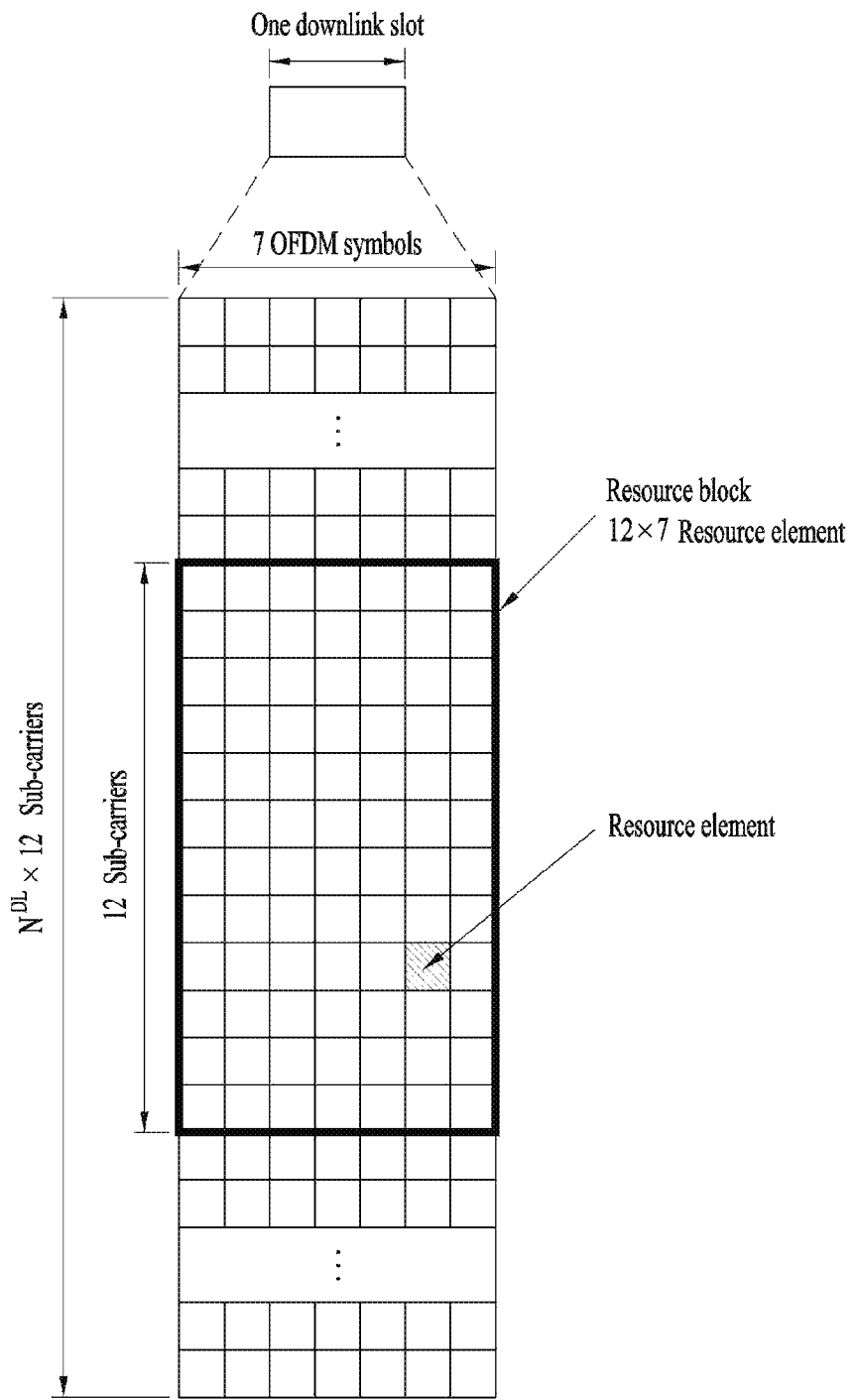
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
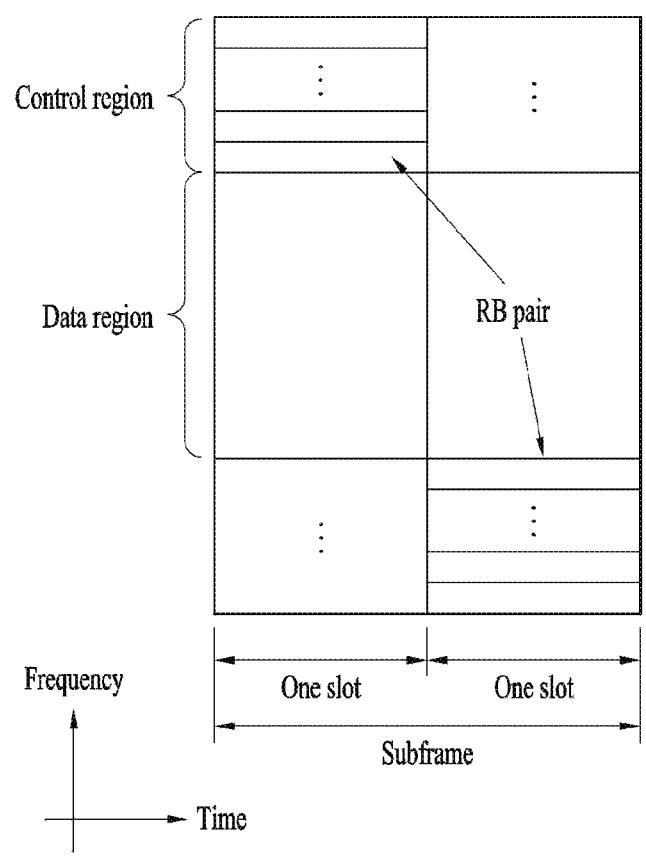
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
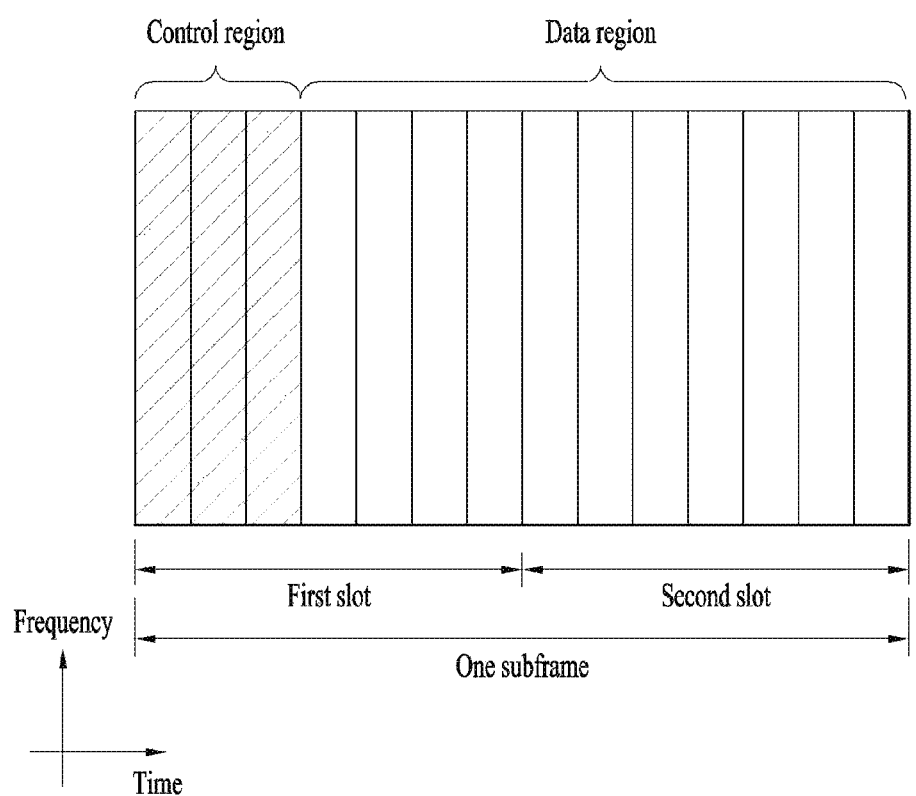
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices require greater communication capacity, there is a need for mobile broadband communication enhanced over existing radio access technology (RAT). Massive Machine-Type Communications (MTC), which provides a variety of services by connecting multiple devices and objects anywhere and anytime, is also considered. In addition, communication system design considering services/UEs sensitive to reliability and latency is also under discussion.

Thus, introduction of a new radio access technology considering enhanced mobile broadband communication, massive MTC, and Ultra-Reliable and Low Latency Communication (URLLC) is being discussed. In the present invention, for simplicity, this technology will be referred to as New RAT.

2.1. Self-Contained Subframe Structure

Figure 6:
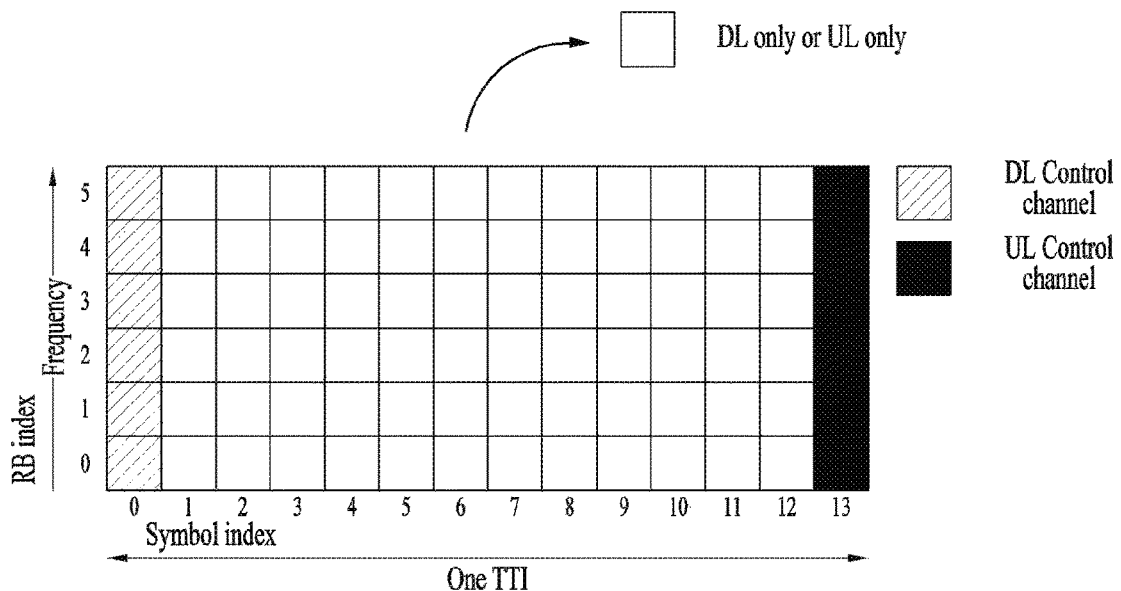
FIG. 6 is a diagram illustrating a self-contained subframe structure applicable to the present invention.

FIG. 6 is a diagram illustrating a self-contained subframe structure applicable to the present invention.

In the New RAT system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain time length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone as shown in FIG. 6.

For simplicity of explanation, the frame structure configured as above is referred to as a subframe, but this configuration can also be referred to as a frame or a slot. For example, in the New RAT system, one unit consisting of a plurality of symbols may be referred to as a slot. In the following description, a subframe or a frame may be replaced with the slot described above.

2.2. OFDM Numerology

The New RAT system uses the OFDM transmission scheme or a similar transmission scheme. Here, the New RAT system may typically have the OFDM numerology as shown in Table 2.

TABLE 2

| Parameter | Value |
| --- | --- |
| Subcarrier-spacing (Δf) | 75 kHz |
| OFDM symbol length | 13.33 μs |
| Cyclic Prefix(CP) length | 1.04 us/0.94 μs |
| System BW | 100 MHz |
| No. of available subcarriers | 1200 |
| Subframe length | 0.2 ms |
| Number of OFDM symbol per Subframe | 14 symbols |

Alternatively, the New RAT system may use the OFDM transmission scheme or a similar transmission scheme, and may use an OFDM numerology selected from among multiple OFDM numerologies as shown in Table 3. Specifically, as disclosed in Table 3, the New RAT system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the New RAT system according to the present invention, and the values thereof may vary depending on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the New RAT system according to the present invention, and the values thereof may vary depending on the implementation method.

Figure 8:
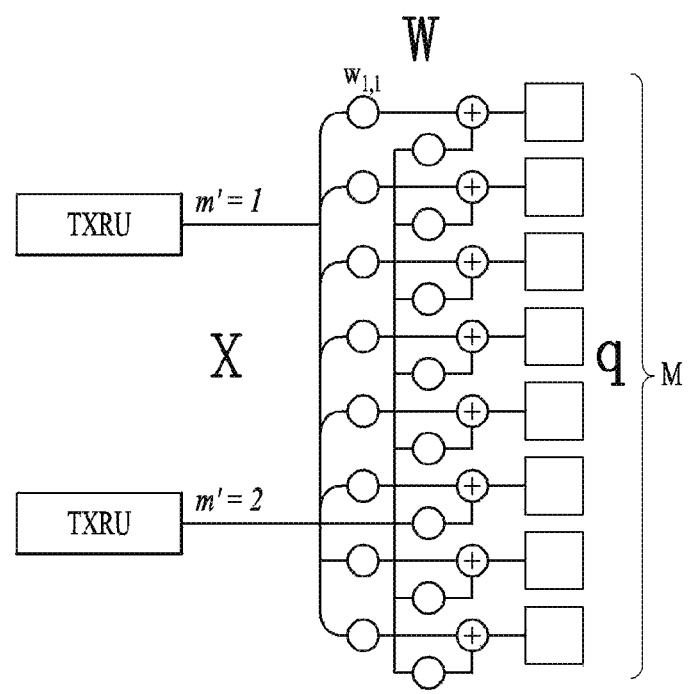

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

Figure 7:
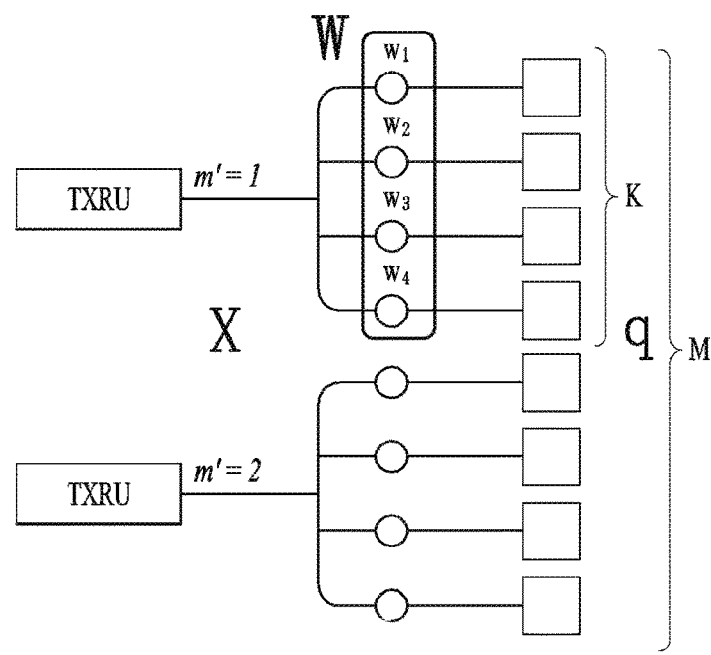
FIGS. 7 and 8 are diagrams illustrating representative methods for connecting TXRUs to antenna elements.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily

TABLE 3

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

achieved. However, since all antenna elements are connected to the TXRU, it has a disadvantage of high cost.

2.4. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

2.5. Channel Coding

In a wireless communication system, the probability of error occurrence is high since signals are transmitted over a radio channel. Therefore, in order to allow the reception terminal to correct an error occurring in the radio channel, the transmission terminal transmits information by encoding the information using an error correction code, which is referred to as channel coding. The reception terminal demodulates the received signal, and decodes the error correction code, thereby restoring the information sent by the transmission terminal. That is, the reception terminal corrects, through the decoding process, an error in the received signal that is produced on the wireless channel. There are various types of error correction codes, for example, a turbo code and an LDPC code.

2.5.1. Turbo Code

The turbo code is implemented using a recursive systematic convolution encoder and an interleaver. The turbo code includes an interleaver for facilitating parallel decoding. Interleaving by the interleaver is intended to reduce the effect of burst errors, which occur when a signal is transmitted over a radio channel. An example of the interleaver is a quadratic polynomial permutation (QPP) interleaver.

It is known that the performance of the turbo code is enhanced as the data block size increases. In an actual communication system, a data block whose size is greater than or equal to a predetermined size is divided into a plurality of small data blocks and encoded for ease of implementation.

Figures 9, 10:
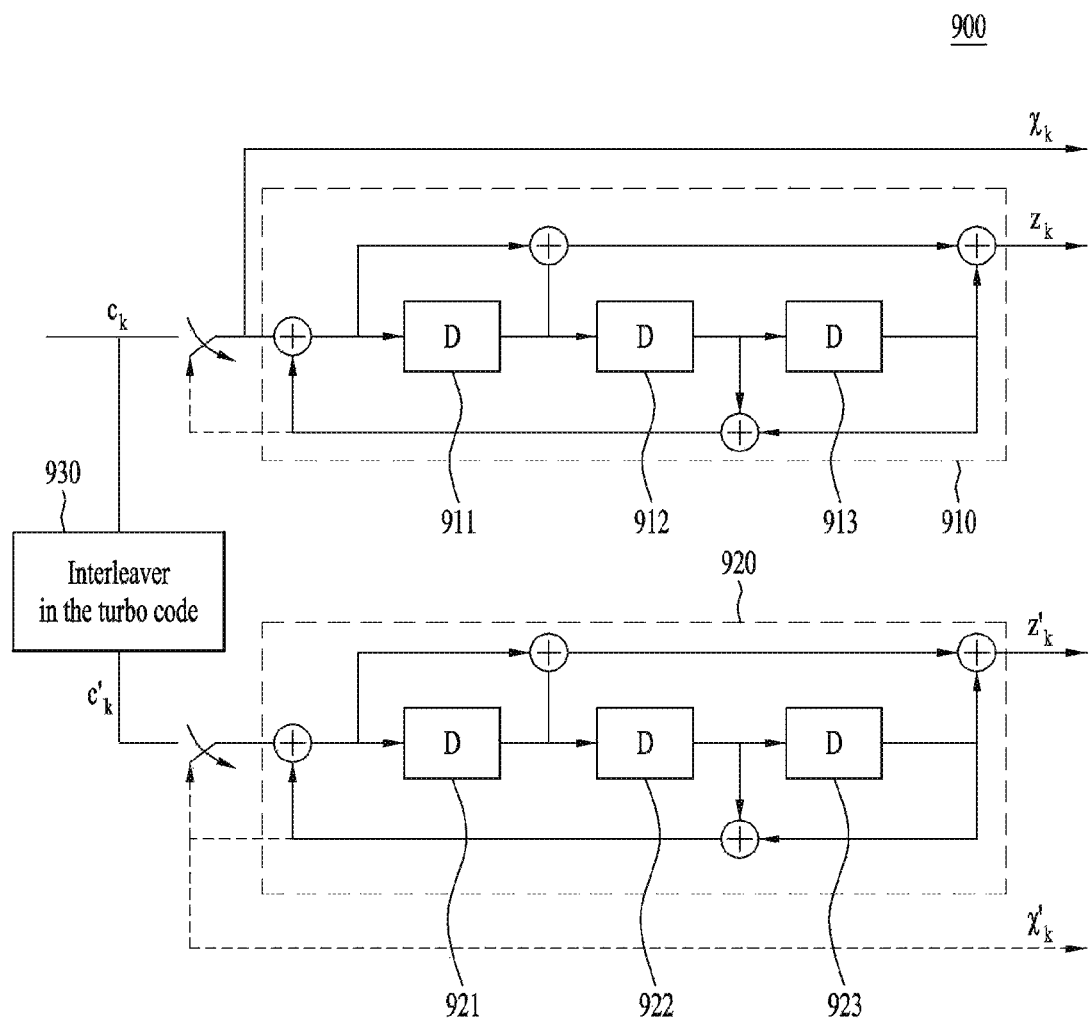
FIG. 9 is a diagram illustrating a turbo encoder.
FIG. 10 is a diagram showing respective elements of a parity check matrix of a Low Density Parity Check (LDPC) code.

FIG. 9 is a diagram illustrating a turbo encoder.

The coding scheme of the turbo encoder 900 is a parallel concatenated convolutional code (PCCC) having two 8-state constituent encoders 910 and 920 and one turbo code internal interleaver 930.

In FIG. 9, the turbo encoder 900 includes a first constituent encoder 910, a second constituent encoder 920, and a turbo code internal interleaver 930. The first constituent encoder 910 and the second constituent encoder 920 are 8-state constituent encoders. Each of the first constituent encoder 910 and the second constituent encoder 920 is configured in a similar structure to the RSC encoder of FIG. 3. Each of the first constituent encoder 910 and the second constituent encoder 920 includes three delay units 911, 912, 913, 921, 922, 923.

In FIG. 9, D is a value determined according to the coding scheme. And $c_k$ is an input to the turbo encoder 900. The outputs from the first constituent encoder 910 and the second constituent encoder 920 are denoted by $z_k$ and $z'_k$, respectively. The value output from the turbo code internal interleaver 930 is denoted by $c'_k$. In general, the delay units 911, 912, 913, 921, 922, and 923 may delay the input value by one clock. However, the delay units 911, 912, 913, 921, 922, and 923 may be configured to delay the input value by one clock or more depending on the internal setting. The delay unit 911, 912, 913, 921, 922, 923 may be configured as a shift register, and may be configured to delay input bits by a predetermined clock and then output the input bits to the next delay unit 911, 912, 913, 921, 922, 923.

The turbo code internal interleaver 930 may reduce the influence of a burst error that may occur when a signal is transmitted on a radio channel. For example, the turbo code internal interleaver 930 may be a Quadratic Polynomial Permutation (QPP) interleaver.

The turbo code is a high-performance forward error correction (FEC) code that is used in LTE communication systems. For example, a data block coded by the turbo code may be composed of three sub-blocks. One sub-block may correspond to m-bit payload data. Another subblock may be composed of parity bits of n/2 bits for the payload, calculated using a recursive systematic convolution (RSC) code. The other subblock may be composed of parity bits of n/2 bits for permutation of payload data, calculated using an RSC code. For example, the aforementioned permutation may be performed by an interleaver. Therefore, the payload and two sub-blocks of different parity bits may constitute one block. For example, if m is equal to n/2, one block has a code rate of ⅓.

In the first constituent encoder 910, the process in which the input $c_k$ reaches the encoded bit $z_k$ may be divided into two paths. The two paths are a first path connected from the input stage to an output stage without an output feedback and a second path along which feedback is delivered from an input stage back to the input stage.

On the first path, the input $c_k$, an input $c_k$ obtained via the delay 911, and an input $c_k$ obtained via the delays 911, 912, and 913 are applied to an output stage. The relationship between the input stage and the output stage for the first path may be expressed as a polynomial. The polynomial for the first path is referred to as a forward generator polynomial, and may be expressed as g1 in the following equation.

$$g1(D)=1+D+D^3 \quad \text{Equation 1}$$

On the second path, the input $c_k$, an input $c_k$ obtained via the delays 911 and 912, and an input $c_k$ obtained via the delays 911, 912 and 913 are fed back to the input stage. The polynomial for the second path is referred to as a recursive generator polynomial and may be expressed as g0 in the following equation.

$$g0(D)=1+D^2+D^3 \quad \text{Equation 2}$$

In Equations 1 and 2, "+" denotes exclusive OR (XOR), and 1 means that the input undergoes 0 delay. $D^n$ means that the input undergoes n delays.

2.5.2. Low Density Parity Check (LDPC) Code

The low density parity check (LDPC) code, which is a linear block code, is used in IEEE 802.11n, 802.11ac, Digital Video Broadcasting (DVB), and the like. The LDPC code may be composed of a generation matrix and a parity check matrix. In the LDPC code, the data may be encoded by multiplying the message bits by the generation matrix. Generally, in a communication standard using the LDPC code, the parity check matrix may be used instead of the generation matrix. For example, data may be encoded using a parity check matrix.

A linear block code may be generated based on the generation matrix G or the parity check matrix H. The linear block code is configured such that $Hc^t$ has a value of zero for all codewords. Operation on the LDPC code may also be performed by checking whether the product of the parity check matrix H and the codeword c becomes '0', like other linear block codes. For example, decoding of the LDPC code may be performed by determining whether the product (i.e., $Hc^t$) of the transpose matrix of the codeword c and the parity check matrix is zero.

In the LDPC code, most of the elements of the parity check matrix are 0, and the number of elements which are not 0 is small compared to the length of the code. Therefore, iterative decoding based on probability may be performed on the LDPC code. In the initially proposed LDPC code, the parity check matrix is defined in a non-systematic form and a small weight is uniformly applied to the rows and columns of the parity check matrix. The weight may mean the number of 1's contained in a row or column.

As described above, the density of elements which are not 0 in the parity check matrix H of the LDPC code is low. Therefore, the LDPC code has a performance close to Shannon's theoretical limit while having low decoding complexity. Due to the high error correction performance and low decoding complexity of the LDPC code, the LDPC code is suitable for high-speed wireless communication.

Hereinafter, a structured LDPC code will be described.

As described above, the parity check matrix H may be used to generate an LDPC code. The matrix H contains many 0's and a small number of 1's. The size of the matrix H may be greater than or equal to $10^5$ bits or more, and presenting the matrix H may consume a large amount of memory. In the structured LDPC code, the elements of the matrix H may be expressed as sub-blocks of a predetermined size as shown in FIG. 10. In FIG. 10, each element of the matrix H represents one sub-block.

Figure 11:
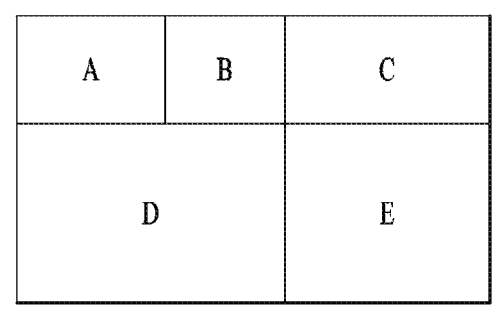

FIG. 11 is a diagram illustrating an example of the parity check matrix applicable to the LDPC code.

As shown in FIG. 11, the parity check matrix may be composed of five sub-matrices A, B, C, D, and E. Here, A corresponds to systematic bits, and B, which has a square structure, corresponds to parity bits. The first or last column may have a weight of 1. Values different from 0 may be located in the last row of B, and this row may have a weight of 1.

If there is a column having a weight of 1, the remaining columns may include a square matrix in which the first column has a weight of 3. The columns following the column having a weight of 3 may have a dual diagonal structure.

If there is no column having a weight of 1, B may be configured only as a square matrix in which the first column has a weight of 3. The columns following the column having the weight of 3 may have a dual diagonal structure.

Also, C is a zero matrix and E is an identity matrix.

3. Proposed Embodiment

Hereinafter, the present invention proposes a method of forming, by a UE having a plurality of antenna elements, a reception beam (Rx beam) by analog beamforming, based on the disclosure above. Specifically, the present invention proposes a dynamic point selection (DPS) operation in which, when a UE receives a signal from a base station, the UE dynamically changes a reception beam according to change in the transmission beam of the transmission base station.

Figure 12:
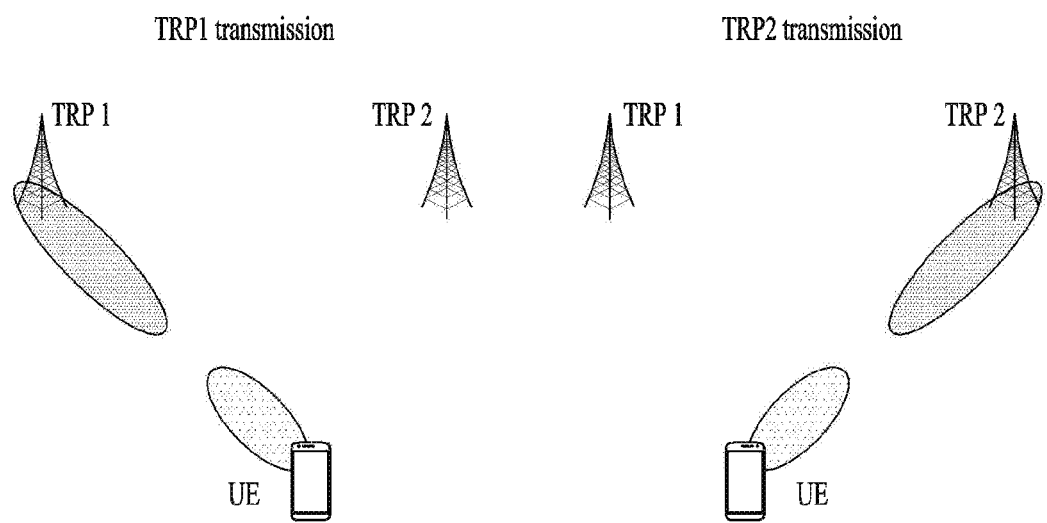
FIG. 12 is a diagram illustrating an example of a DPS CoMP (Coordinated Multi Point) operation performed by two transmission reception points (TRPs) and a UE.

FIG. 12 is a diagram illustrating an example of a DPS CoMP (Coordinated Multi Point) operation performed by two transmission reception points (TRPs) and a UE.

The coordinated multi-point (CoMP) scheme according to the DPS scheme may be an effective transmission scheme for improvement of connection reliability and load balancing between TRPs even in the mmW band to which the present invention is applicable. As shown in FIG. 12, transmission efficiency may be enhanced by allowing a TRP having a better channel state or lower load between the base stations TRP1 and TRP2 to transmit a signal to the UE.

At this time, the TRP to transmit a signal may be dynamically changed on a subframe (SF)-by-SF basis. In this case, the transmission efficiency may be maximized.

As such, when the UE receives a signal from the base station by forming a reception beam by analog beamforming, the UE may change the direction of the optimum reception beam of the UE depending on which TRP transmits the signal, as shown in FIG. 12. For example, if the UE has only two ports (e.g., one H (horizontal) slant and one V (vertical) slant), the UE may receive signals of two TRPs or beams in different directions simultaneously.

Accordingly, the UE needs to know in advance which TRP transmits the signal. However, the above issue may conflict with the requirements for dynamically changing the transmission TRP on the SF-by-SF basis.

Figure 13:
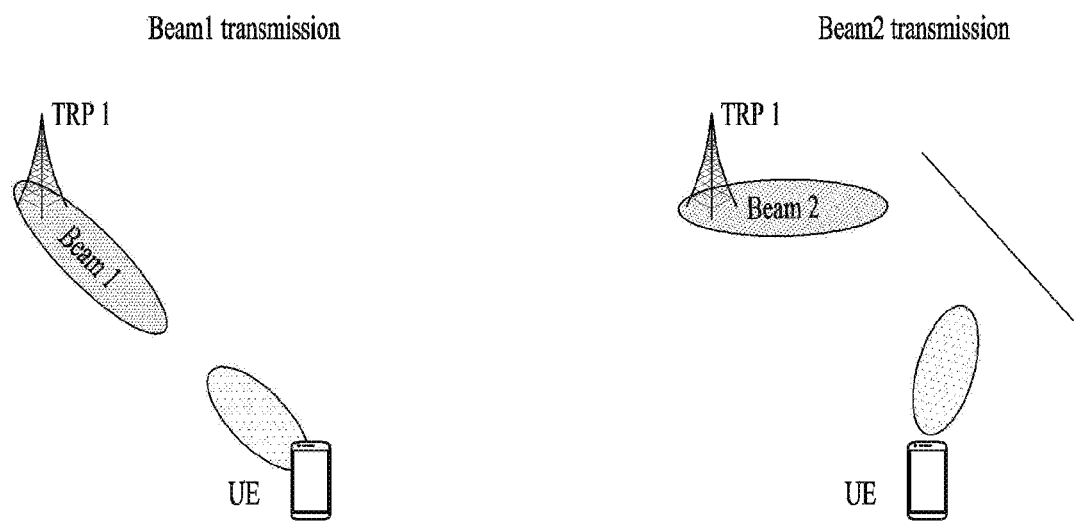
FIG. 13 is a diagram illustrating an example of data transmission from a single TRP through a dynamic beam selection operation.

FIG. 13 is a diagram illustrating an example of data transmission from a single TRP through a dynamic beam selection operation.

As shown in FIG. 13, a base station may transmit a signal through a transmission beam (Tx beam) having a better channel state between Beam 1 and Beam 2 or a Tx beam selected in consideration of multiplexing with a signal transmitted to another UE, thereby enhance transmission efficiency. At this time, the beam direction in which the station transmits a signal may be dynamically changed on the SF-by-SF basis, thereby maximizing transmission efficiency. Even in this case, the UE may change the direction of the optimum reception beam according to the beam direction in which the base station transmits the signal, as shown in FIG. 13.

In the following description, a base station may refer to a TRP that directly transmits a signal, or may refer to a TRP configured to control the operation of one or more TRPs or an upper-level constituent configured to control the TRPs. For example, the base station according to the present invention may be a serving TRP among a plurality of TRPs or a constituent configured to control the operation of the plurality of TRPs.

To perform the operations of FIGS. 12 and 13, the UE may measure a reference signal received power (RSRP) for a beamformed reference signal (B-RS) in advance and report, to the base station, a plurality of beam directions in which a good link condition or a strong link is formed. To this end, the TRP may transmit one B-RS in each Tx beam direction. That is, in the case where the TRP transmits signals in N Tx beam directions, the TRS may transmit N B-RSs in the respective Tx beam directions. Herein, the N B-RSs may be distinguished from each other by setting or assigning different port indexes.

A UE according to the present invention may measure RSRPs for B-RSs transmitted from a serving TRP and neighbor TRPs, and report, to the base station, RSRPs measured for one or more B-RSs satisfying a predetermined condition.

Here, the UE may determine the direction of a corresponding reception beam for each B-RS in order to measure the RSRPs for the B-RSs.

Thus, when the UE according to the present invention reports some or all of the measured RSRPs to the base station, the UE may report, to the base station, the B-RSs (Tx beams) for which RSRPs are reported and the Rx beams through which the RSRPs are received. In other words, the UE according to the present invention may report, to the base station, the B-RS index, Rx beam index, and RSRP of one or more B-RSs satisfying a predetermined condition among a plurality of measured B-RSs. Thus, the base station may determine, through the reported Rx beam indexes, whether the UE uses different Rx beams or the same Rx beam to receive a plurality of Tx beams.

Subsequently, the base station may determine a TRP to participate in data transmission for the UE and a set of Tx beams of the selected TRP, based on the reported RSRPs. Here, the beams in the Tx beam set may be beams transmitted from the same TRP or beams transmitted from different TRPs. The determined Tx beam set may be delivered to the UE directly or indirectly through the following methods.

3.1. Method for Transmitting Information about a Tx Beam Set 3.1.1. Method for Transmitting Information about a First Tx Beam Set The base station may directly deliver the information about the Tx beam set to the UE using RRC signaling. Then, the UE may use the information to determine an optimized Rx beam for each Tx beam included in the Tx beam set. In other words, the UE may determine Rx beams through which the UE may optimally receive the B-RSs corresponding to the Tx beams included in the Tx beam set.

3.1.2. Method for Transmitting Information about a Second Tx Beam Set

The base station may configure a CSI-RS corresponding to each Tx beam included in the Tx beam set for the UE. For example, if the Tx beam set includes K Tx beams, the base station may inform the UE of K CSI-RS configurations. Then, the UE may use the information to determine an Rx beam for each configured CSI-RS through which the UE may optimally receive the respective CSI-RSs.

Alternatively, the base station may configure a beam refinement RS (BR-RS) corresponding to each Tx beam included in the Tx beam set for the UE. Then, the UE may determine an Rx beam for each configured BR-RS through which the UE may optimally receive each BR-RS.

Using the method described above, the Tx beams of the base station or a plurality of TRPs and the Rx beams of the UE may be paired. Herein, when the base station switches the Tx beam to allow the UE to receive a signal through the optimum Rx beam, the base station may dynamically announce whether switching is performed through the following methods.

3.2. Method for Transmitting Information about Tx Beam Switching 3.2.1 First Method for Transmitting Information about Tx Beam Switching The base station may designate a Tx beam for a corresponding PDSCH on the PDCCH. That is, the base station may include, in the DCI transmitted on the PDCCH, information about a beam index for transmitting the corresponding PDSCH (or information corresponding thereto, for example, B-RS port indexes or CSI-RS configuration indexes or BR-RS port indexes using the same Tx beam) and transmit the DCI to the UE.

In the case where a B-RS port index (or the CSI-RS configuration index or the BR-RS port index) is designated, the UE may receive a corresponding PDSCH using an Rx beam that is used in receiving the corresponding B-RS port (or the corresponding CSI-RS or the corresponding BR-RS).

In the method proposed above, the UE determines an Rx beam for receiving the PDSCH, through PDCCH decoding. Therefore, a gap of a predetermined time may be needed between the PDCCH transmission end time and the PDSCH transmission start time. In other words, the UE may complete DCI decoding during the gap time to acquire information about the Rx beam, thereby receiving the subsequently transmitted PDSCH using an optimum Rx beam.

Here, the reception beam configuration method of the UE for PDCCH reception may be configured according to the following methods.

3.2.1.1. 1-1-st PDCCH Rx Beam Configuration Method

The PDCCH may be transmitted through a fixed (or preconfigured) Tx beam of a fixed (or preconfigured) TRP. That is, a serving Tx beam for transmitting the PDCCH may be designated in advance. In one example, the PDCCH may be configured to be transmitted through a first Tx beam in the Tx beam set. Accordingly, the UE may receive the PDCCH using an Rx beam paired with the configured Tx beam.

3.2.1.2. 1-2-nd PDCCH Rx Beam Configuration Method

The UE may receive the PDCCH using a wide Rx beam. Alternatively, the UE may receive the PDCCH by forming multiple beams so as to receive all signals reaching in the directions of Rx beams paired with the Tx beams included in the Tx beam set.

3.2.1.3. 1-3-Rd PDCCH Rx Beam Configuration Method

In the case where the UE has a plurality of Rx antenna ports, the UE may receive the PDCCH by differentiating the Rx beam for each Rx antenna port during the PDCCH reception period. For example, if the UE includes two Rx antenna ports and there are two Tx beams in the Tx beam set, the UE may apply Rx beam 1 paired with Tx beam 1 to Rx antenna port 1 to receive a PDCCH signal and apply Rx beam 2 paired with Tx beam 2 to Rx antenna port 2 to receive a PDCCH signal. Thereby, the UE may receive PDCCH signals in different beam directions for the respective antenna panels.

3.2.2. Second Method for Transmitting Information about Tx Beam Switching

The UE may determine a downlink Tx beam and a corresponding Rx beam according to an SF by differentiating SF sets from each other.

For example, if the Tx beam set includes two Tx beams, the base station may divide the SFs into an even number SF set and an odd number SF set such that the PDCCH and the PDSCH are transmitted through Tx beam 1 in the even number SF set and transmitted through Tx beam 2 in the odd number SF set.

In response, the UE may use Rx beam 1 paired with Tx beam 1 in the odd-numbered SF set and use Rx beam 2 paired with Tx beam 2 to receive the PDCCH signal.

In order to maintain and use a Tx beam selected according to the method described above for a predetermined time, the base station may use the same Tx beam for PDCCH and PDSCH transmissions in consecutive SFs. That is, in the case where a PDCCH signal and a PDSCH signal are transmitted in a burst form in consecutive SFs, the base station may determine a Tx beam based on an SF set in which the first SF of the burst is included.

In response, if there is PDCCH and PDSCH transmission to the UE in all SFs, the UE may assume that the same Tx beam as used in the previous SF is used in the current SF, and receive a signal such as the PDCCH using an Rx beam paired with the Tx beam.

Accordingly, in the proposed method, the base station is capable of stopping data transmission to a specific UE during one SF to change the Tx beam.

3.2.3. Third Method for Transmitting Information about Tx Beam Switching

The base station may pre-indicate, to the UE, whether TRP change occurs through the DCI. Specifically, the base station may indicate, through the DCI, which is transmitted on the PDCCH, a Tx beam to transmit the PDCCH and the PDSCH after a few SFs from an SF in which the PDCCH is transmitted. That is, the base station may transmit a signal by applying a Tx beam indicated to the UE in the n-th SF, starting from the (n+k)-th SF.

Alternatively, the base station may divide the SFs into groups. Typically, the base station may group SFs for 10 ms into one group, and inform the UE of a Tx beam to be used during the next SF group through the DCI.

At this time, the UE may not successfully decode the DCI including a Tx beam indicator. Then, the UE may not properly configure an Rx beam for the next PDCCH reception, and thus a continuous DCI reception error may occur.

As a method to mitigate this issue, the base station may designate a fallback SF at regular intervals and transmit the PDCCH and the PDSCH only through the serving Tx beam in the corresponding SFs. In response, the UE may receive the PDCCH and the PDSCH using an Rx beam paired with the serving Tx beam in the fallback SFs configured at regular intervals.

In the proposed methods as described above, the PDSCH and the PDCCH for delivering the scheduling DCI therefor may be transmitted by the same Tx beam through the same Tx beam or through different Tx beams.

After receiving the PDSCH, the UE may report, on the PUCCH, HARQ ACK/NACK feedback information indicating whether decoding is successful to the base station. At this time, one of the following methods may be applied to the Tx beam for the UE to use for PUCCH transmission.

(1) The UE may use an Rx beam of the UE paired with a Tx beam of a TRP designated through RRC signaling as a Tx beam of the UE for PUCCH transmission. That is, the UE may determine an Rx beam of the UE paired with a Tx beam of the TRP designated through RRC signaling, and transmit the PUCCH using a Tx beam of the UE which has the same beam direction as the Rx beam of the UE or is determined to correspond to the Rx beam of the UE according to a predetermined rule.

(2) The UE may use an Rx beam of the UE paired with a Tx beam of the TRP designated in the scheduling DCI for the PDSCH as a Tx beam for PUCCH transmission. That is, the UE may determine an Rx beam of the UE paired with a Tx beam of the TRP designated through scheduling DCI for scheduling the PDSCH, and transmit the PUCCH using a Tx beam of the UE which has the same beam direction as the Rx beam of the UE or is determined to correspond to the Rx beam of the UE according to a predetermined rule.

(3) The UE may use an Rx beam of the UE which has been used to receive the scheduling DCI for the PDSCH as a Tx beam for PUCCH transmission. That is, the UE may transmit the PUCCH using a Tx beam of the UE which has the same beam direction as the Rx beam of the UE used for the UE to receive the scheduling DCI for scheduling the PDSCH (or a PDCCH including the scheduling DCI) or is determined to correspond to the Rx beam of the UE according to a predetermined rule.

(4) The UE may use an Rx beam of the UE which has been used to receive the PDSCH as a Tx beam for PUCCH transmission. That is, the UE may transmit the PUCCH using a Tx beam of the UE which has the same beam direction as the Rx beam of the UE used for the UE to receive the PDSCH or is determined to correspond to the Rx beam of the UE according to a predetermined rule.

The proposed configuration of the present invention described above may be summarized as follows.

A UE including a plurality of antenna elements may receive a data signal from a base station including one or more TRPs. Here, the data signal may be transmitted by applying analog beamforming.

To this end, the UE receives, from the base station, information about a Tx beam through which a data signal is transmitted. Here, the information about the Tx beam through which the data signal is transmitted may be transmitted on a PDCCH corresponding to the PDSCH on which the data signal is transmitted. In addition, the information about the Tx beam through which the data signal is transmitted may include at least one of a beam index of the Tx beam or a reference signal index corresponding to the Tx beam.

Here, the PDCCH may be transmitted through a Tx beam of a preconfigured (or fixed) base station, and the UE may receive the PDCCH using an Rx beam of the UE corresponding to the Tx beam of the preconfigured base station. Here, the configuration information may be designated through RRC signaling.

Alternatively, the UE may receive the PDCCH using a wide Rx beam. In other words, the UE may receive the PDCCH by forming multiple beams so as to receive all signals transmitted through a plurality of Tx beams transmitted by the base station.

Alternatively, the UE may receive a PDCCH signal by differently applying Rx beams of the UE corresponding to the plurality of Tx beams of the base station according to the antenna ports (or antenna panels) during the PDCCH period. In other words, the UE may receive the PDCCH signal in different Rx beam directions for the respective antenna ports (or antenna panels). The base station may correspondingly transmit the PDCCH signal in each of a plurality of Tx beam directions or in a part of the plurality of Tx beam directions, and the UE may receive the PDCCH signal without suffering any problem.

In this case, the UE determines an Rx beam for receiving the PDSCH through PDCCH decoding. Therefore, a gap of a predetermined length of time may be included between the transmission end time of the PDCCH and the transmission start point of the PDSCH. In other words, the UE may receive the PDCCH using one of the various methods mentioned above, determine an optimum Rx beam for receiving the PDSCH when decoding of the PDCCH is completed, and receive the PDSCH using the determined Rx beam.

As another example, the UE may receive, from the base station, information indicating a Tx beam for each SF set as information about a Tx beam through which a data signal is transmitted. Here, the information may be delivered through RRC signaling or DCI, or may be a value pre-agreed between the base station and the UE.

For example, when an SF set is divided into two SF sets and Tx beams are configured for each of the SF sets, the UE may determine an SF set including an SF for which a data signal (e.g., PDSCH) is scheduled and receive the PDSCH using an Rx beam of the UE corresponding to the determined SF set.

Additionally, as a method for determining an optimum Tx beam/Rx beam between a UE and a base station, the UE according to the present invention may receive RSs (e.g., B-RSs) of the base station for a plurality of Tx beams of the base station, and report, to the base station, information about one or more RSs satisfying a predetermined condition among the received RSs.

More specifically, the UE may determine Rx beams for the respective B-RSs configured for the respective Tx beams of the base station in order to receive the B-RSs, and then receive each B-RS using a corresponding Rx beam. At this time, the UE may measure the RSRP for each of the B-RSs.

Subsequently, the UE may report the measured RSRP to the base station. In this case, the UE may report RSRPs for a part of the B-RSs to the base station instead of reporting RSRPs for all the B-RSs. The part of the B-RSs may be RSs corresponding to some Tx beam (or Rx beams) having a good channel state.

In this way, the base station may acquire information (e.g., RSRP) about one or more Tx beams having a good channel state with respect to the UE among the plurality of Tx beams. Here, the information may also include information about the Rx beams of the UE for receiving the one or more Tx beams.

The base station and the UE may determine an optimum Tx beam/Rx beam for transmitting and receiving data signals through the method described above. In addition, the base station may determine a Tx beam (or TRP) set to participate in data transmission to the UE, based on the RSRPs reported from the UE, and deliver information thereabout to the UE. In response, the UE may determine an optimum Rx beam for each Tx beam.

Here, the information delivered to the UE (the information about the Tx beam set for data signal transmission) to be transmitted to the UE may include one or more of indexes of one or more Tx beams for data signal transmission and a channel state information reference signal (CSI-RS) corresponding to the one or more Tx beams for data signal transmission.

Additionally, the UE may transmit, to the base station, acknowledgment information (e.g., HARQ ACK/NACK information) for the data signal received from the base station. Here, due to the characteristics of analog beamforming, the UE may determine a Tx beam of the UE for transmitting the acknowledgment information as one of the following.

As one example, the UE may use an Rx beam of the UE corresponding to the Tx beam of the base station configured through RRC signaling as the Tx beam of the UE for transmitting the acknowledgment information. That is, the UE may transmit the acknowledgment information to the base station using a Tx beam of the UE which has the same beam direction as the Rx beam of the UE determined by RRC signaling or is determined to correspond to the Rx beam of the UE according to a predetermined rule.

As another example, the UE may use an Rx beam of the UE corresponding to the Tx beam of the base station indicated by the scheduling information about the data signal as the Tx beam of the UE for transmitting the acknowledgment information. In other words, the UE may transmit the acknowledgment information to the base station using a Tx beam of the UE which has the same beam direction as an Rx beam of the UE determined based on the Tx beam of the base station indicated by the scheduling DCI about the PDSCH, or is determined to correspond to the Rx beam of the UE according to a predetermined rule.

As another example, the UE may use an Rx beam of the UE used for receiving the scheduling information about the data signal as a Tx beam of the UE for transmitting the acknowledgment information. In other words, the UE may transmit the acknowledgment information to the base station using a Tx beam of the UE which has the same beam direction as the Rx beam of the UE used for receiving the scheduling DCI about the PDSCH (or a PDCCH including the same) or is determined to correspond to the Rx beam of the UE according to a predetermined rule.

As another example, the UE may use an Rx beam of the UE used for receiving the data signal as a Tx beam of the UE for transmitting the acknowledgment information. In other words, the UE may transmit the acknowledgment information to the base station using a Tx beam of the UE which has the same beam direction as an Rx beam of the UE used for receiving the PDSCH or is determined to correspond to the Rx beam of the UE according to a predetermined rule.

4. Device Configuration

Figure 14:
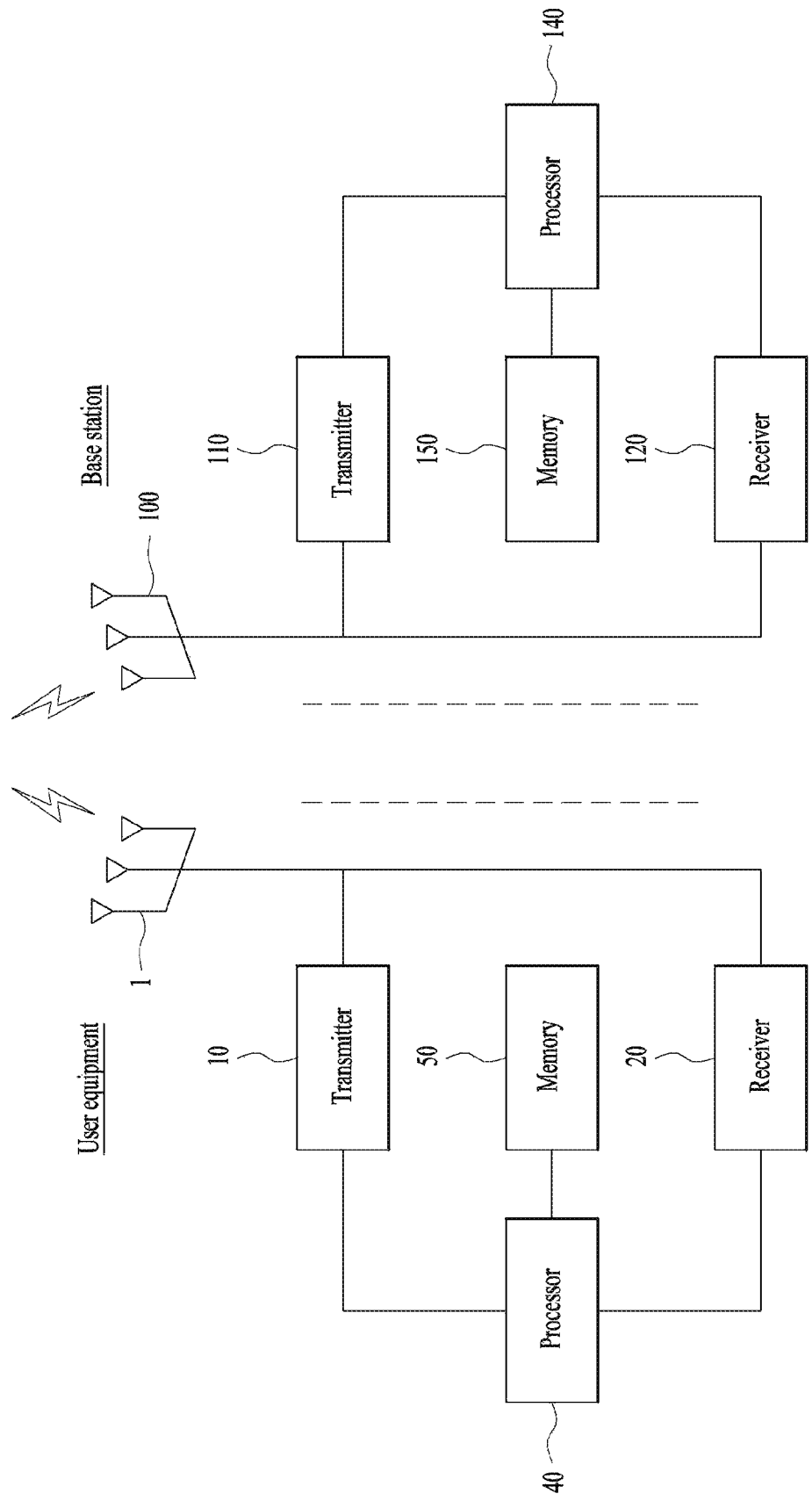
FIG. 14 is a diagram illustrating a configuration of a user equipment and a base station in which the proposed embodiments may be implemented.

FIG. 14 is a diagram illustrating configurations of a UE and a base station capable of being implemented by the embodiments proposed in the present invention. The UE and the base station shown in FIG. 14 operate to implement the embodiments of the method for transmitting and receiving a data signal between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The base station 100 configured as described above may be configured to transmit information about a Tx beam through which a data signal is transmitted to the UE 1 through the Tx 110 and to transmit the data signal to the UE 1 through the Tx 110 using the Tx beam.

Here, the data signal may be transmitted on a PDSCH, and the information about the Tx beam may be transmitted on a PDCCH for scheduling the PDSCH. In transmitting the PDSCH, the base station may start transmitting the PDSCH a predetermined length of time after transmission of the PDCCH ends.

In response to the base station 100 configured as described above, the terminal 1 may be configured to receive, through the Rx 20, information about the Tx beam through which the data signal is transmitted from the base station 100 and to receive the data signal from the base station through the Rx 20 using an Rx beam corresponding to the Tx beam.

As described above, the data signal may be transmitted on the PDSCH, and the information about the Tx beam may be transmitted on the PDCCH for scheduling the PDSCH. Then, the UE may determine an optimum Rx beam by decoding the PDCCH, and then receive the PDSCH using the optimum Rx beam according to the transmission time of the PDSCH.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g., CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of receiving a data signal, by a user equipment from a base station in a wireless communication system, the method comprising:
    receiving via radio resource control (RRC) signaling from the base station, channel state information reference signal (CSI-RS) configurations including each of transmission beam configurations;
    receiving from the base station, control information on a transmission beam for a physical downlink shared channel (PDSCH), through a physical downlink control channel (PDCCH),
    wherein the control information includes an indication related to one of the CSI-RS configurations;
    receiving, from the base station, the data signal through the PDSCH based on the control information, and
    wherein, based on assumption of a transmission beam related to the one of the CSI-RS configurations indicated by the control information, the data signal is received through the PDSCH starting after a time gap having a certain length from a transmission terminating point of the PDCCH.

2. The method of claim 1, wherein the user equipment receives the control information through a reception beam corresponding to a preconfigured transmission beam.

3. The method of claim 2, wherein the preconfigured transmission beam is configured to a first transmission beam included in a specific transmission beam set.

4. The method of claim 1, further comprising:
    transmitting acknowledgment information for the data signal to the base station,
    wherein the acknowledgment information is transmitted through a transmission beam of the user equipment corresponding to one of:
    a reception beam of the user equipment corresponding to a transmission beam of the base station configured through remote radio control (RRC) signaling;
    a reception beam of the user equipment corresponding to a transmission beam of the base station indicated by scheduling information about the data signal;
    a reception beam used to receive the scheduling information about the data signal; or
    a reception beam used to receive the data signal.

5. The method of claim 1, wherein the user equipment receives the control information using a wideband reception beam corresponding to all transmission beams included in a specific transmission beam set.

6. The method of claim 1, wherein the user equipment comprises a plurality of antenna elements.

7. A method of transmitting a data signal by a base station to a user equipment in a wireless communication system, the method comprising:
    transmitting via radio resource control (RRC) signaling to the user equipment, channel state information reference signal (CSI-RS) configurations including each of transmission beam configurations;
    transmitting to the user equipment, control information on a transmission beam for a physical downlink shared channel (PDSCH), through a physical downlink control channel (PDCCH),
    wherein the control information includes an indication related to one of the CSI-RS configurations;
    transmitting, to the user equipment, the data signal through the PDSCH based on the control information, and
    wherein, based on assumption of a transmission beam related to the one of the CSI-RS configurations indicated by the control information, the data signal is transmitted through the PDSCH starting after a time gap having a certain length from a transmission terminating point of the PDCCH.

8. The method of claim 7, wherein the base station comprises at least one transmission reception point (TRP).

9. A user equipment for receiving a data signal from a base station in a wireless communication system, the user equipment comprising:
    a transmitter;
    a receiver; and
    a processor configured to operate in connection with the transmitter and the receiver,
    wherein the processor is configured to:
    receive via radio resource control (RRC) signaling from the base station channel state information reference signal (CSI-RS) configurations including each of transmission beam configurations;
    receive from the base station, control information on a transmission beam for a physical downlink shared channel (PDSCH), through a physical downlink control channel (PDCCH);
    wherein the control information includes an indication related to one of the CSI-RS configurations;
    receive, from the base station, the data signal through the PDSCH based on the control information, and
    wherein, based on assumption of a transmission beam related to the one of the CSI-RS configurations indicated by the control information, the data signal is received through the PDSCH starting after a time gap having a certain length from a transmission terminating point of the PDCCH.

10. The user equipment of claim 9, wherein the processor is configured to receive the control information through a reception beam corresponding to a preconfigured transmission beam.

11. The user equipment of claim 10, wherein the preconfigured transmission beam is configured to a first transmission beam included in a specific transmission beam set.

12. The user equipment of claim 9, wherein the processor is further configured to:
    transmit acknowledgment information for the data signal to the base station,
    wherein the acknowledgment information is transmitted through a transmission beam of the user equipment corresponding to one of:
    a reception beam of the user equipment corresponding to a transmission beam of the base station configured through remote radio control (RRC) signaling;
    a reception beam of the user equipment corresponding to a transmission beam of the base station indicated by scheduling information about the data signal;
    a reception beam used to receive the scheduling information about the data signal; or
    a reception beam used to receive the data signal.

13. The user equipment of claim 9, wherein the processor is configured to receive the control information using a wideband reception beam corresponding to all transmission beams included in a specific transmission beam set.

14. The user equipment of claim 9, wherein the user equipment comprises a plurality of antenna elements.

15. A base station for transmitting a data signal to a user equipment in a wireless communication system, the base station comprising:
    a transmitter;
    a receiver; and
    a processor configured to operate in connection with the transmitter and the receiver,
    wherein the processor is configured to:
    transmit via radio resource control (RRC) signaling to the user equipment, channel state information reference signal (CSI-RS) configurations including each of transmission beam configurations;
    transmit to the user equipment, control information on a transmission beam for a physical downlink shared channel (PDSCH), through a physical downlink control channel (PDCCH),
    wherein the control information includes an indication related to one of the CSI-RS configurations;
    transmit, to the user equipment, the data signal through the PDSCH based on the control information, and
    wherein, based on assumption of a transmission beam related to the one of the CSI-RS configurations indicated by the control information, the data signal is transmitted through the PDSCH starting after a time gap having a certain length from a transmission terminating point of the PDCCH.

\* \* \* \* \*